United States Patent [19]

Luksas

[11] 3,720,520

[45] March 13, 1973

[54] PREPARATION OF BLEU CHEESE FLAVORED PRODUCT

[75] Inventor: Anthony J. Luksas, Chicago, Ill.

[73] Assignee: Beatrice Food Co., Chicago, Ill.

[22] Filed: Nov. 10, 1971

[21] Appl. No.: 197,481

Related U.S. Application Data

[63] Continuation-in-part of Ser. No. 743,050, July 8, 1968, abandoned.

[52] U.S. Cl..........................99/140 R, 99/59, 99/63, 99/116
[51] Int. Cl. ................................................A23l 1/26
[58] Field of Search..........99/115, 116, 117, 59, 140, 99/63

[56] References Cited

UNITED STATES PATENTS

| | | | |
|---|---|---|---|
| 3,100,153 | 8/1963 | Knight | 99/116 |
| 3,446,627 | 5/1969 | Noznick et al. | 99/115 |
| 2,965,492 | 12/1960 | Bauman et al. | 99/116 |
| 3,563,761 | 2/1971 | Ellinger | 99/63 |
| 3,365,303 | 1/1968 | Hedrick et al. | 99/116 |

*Primary Examiner*—Raymond N. Jones
*Assistant Examiner*—David M. Naff
*Attorney*—Cushman, Darby & Cushman

[57] ABSTRACT

A bleu cheese flavor is produced by growing *Penicillium roqueforti* with aeration in an aqueous medium of sodium caseinate and fat for at least 24 hours at 15° to 40°C.

5 Claims, No Drawings

PREPARATION OF BLEU CHEESE FLAVORED PRODUCT

This is a continuation-in-part of Ser. No. 743,050, filed on July 8, 1968, entitled BLEU CHEESE PRODUCT and now abandoned.

The present invention relates to a process for producing bleu cheese, and to the product obtained thereby. More specifically, the invention relates to developing a bleu cheese flavor produced by *Penicillium roqueforti* growing in a particular growth medium. The product has a sharp, strong, aged bleu cheese odor and flavor.

Many food products are flavored with cheese, for example, sauces, dressing, dips and snackfoods. The amount of cheese incorporated into such foods is relatively small in comparison with the total weight of the food product since the cost of producing cheese is relatively high and the food products into which the cheese is incorporated are intended to be relatively inexpensive.

In view of the economics, the art has attempted to produce cheese flavored products in a more economical manner, which will allow a greater amount of cheese flavoring in the food products. Thus, the art has proposed processes for producing cheese flavors without the necessity of actually producing cheese by the conventional cheese processes. While cheese flavors may be produced by various processes, the basis of these processes is that of growing particular organisms in a growth medium to develop cheese flavors.

Bleu cheese flavors are particularly useful in flavoring food products, but the production of bleu cheese flavors has caused many difficulties in the art.

However, a significant advance in the production of bleu cheese flavors is disclosed in U. S. Pat. No. 3,100,153, to Knight, issued on Aug. 6, 1963. That process produces a bleu cheese flavor which allows the incorporation thereof into various cheese flavored food products at relatively low levels but yet at relatively high flavor contents. A basis of that process is the growing of certain types of *Penicillium roqueforti* in a fluid medium, apart from the normal curd process of producing bleu cheese. By dispensing with the necessity of going through the conventional curd-forming step and relatively slow flavor-development step, bleu cheese flavors can be produced in a relatively short time in the fluid medium.

According to the Knight process, milk is fermented under submerged aerobic conditions with *Penicillium roqueforti*. The fat content of the milk is modified by an enzyme which splits the fat and produces free fatty acids which are converted to ketones by the action of the *Penicillium roqueforti* during the growth process. The *Penicillium roqueforti* used in the process is the white mutant and particularly a vegetative inoculant. The product produced by the process has a high ketone profile of bleu cheese flavor, but is deficient in other of the bleu cheese flavors. Under the circumstances, for commercial applications, the bleu cheese flavor of the Knight process is mixed with naturally produced bleu cheese to supplement the flavor deficiencies of the Knight bleu cheese flavor.

Generally speaking, the developing of a cheese flavor in a fluid medium has the disadvantage that along with development of the desired flavors, unwanted off-flavors are also produced and it is necessary to grow the flavor-producing organisms under conditions that will favor the growth thereof while suppressing growth of other organisms which produce the unwanted off-flavors. The degree of success of mitigating the unwanted off-flavors varies with the processes in the art and some of these off-flavors are still encountered in the Knight process. Hence, the Knight process is deficient in certain of the bleu cheese flavors and still contains significant amounts of unwanted off-flavors, although the Knight process produces a bleu cheese flavor generally superior to prior art bleu cheese flavors.

The Knight process departs from prior cheese flavor producing processes in a number of instances and the advantages and disadvantages of the Knight product are well known to the art. In these latter regards, a full discussion of the Knight process is set forth in the February-March 1970 issue of *Journal of Diary Science*, which discussion is incorporated herein by reference as background to the present invention.

The basic medium of the Knight process is milk, which is the medium used in most cheese flavor-producing processes. Milk has been the medium of choice for most of the cheese flavor processes simply because milk is the starting material for the production of cheese by the conventional processes and the art has assumed that milk is the ideal medium for producing cheese flavors. Of course, as one skilled in the art appreciates, the production of bleu cheese flavors requires the growing of a mold, i.e. *Penicillium roqueforti*, as opposed to bacteria of other natures for producing most other cheese flavors.

It would be advantageous to provide a bleu cheese flavor which more accurately reproduced the flavor profile of bleu cheese, other than mainly the ketone profile as produced by the Knight process, and which does not have significant amounts of unwanted off-flavors. Accordingly, it is an object of the present invention to provide a process which produces an accurate bleu cheese flavor profile and which does not contain significant amounts of unwanted off-flavors. It is a further object to provide a process for the production of such flavors.

As a basis of the present invention, it was discovered that contrary to the assumption in the art, milk was not the ideal growth medium but in fact constituents of milk provided acceptable nutrients for the growth of undesired bacteria and produced unwanted off-flavors. It was further discovered that the growth of *Penicillium roqueforti* in milk grew through a route which acted, to a disproportionate degree, on the fat portion of the milk, which produced largely the ketone flavors of bleu cheese, while not producing corresponding amounts of the protein derived flavor profile of bleu cheese. Based on the discovery that milk was not, in fact, the ideal medium for producing a bleu cheese flavor, the inventor set about to determine what medium could be used to produce a bleu cheese flavor which would obviate the disadvantages of the Knight flavor as noted above.

After experimentation, it was discovered that a bleu cheese flavor of accurate bleu cheese flavor profile and with substantially no unwanted off-flavors could be produced by growing *Penicillium roqueforti* in an aqueous medium which contained essentially only sodium caseinate and butterfat. This relatively pure medium provided the growth nutrients required for producing an accurate bleu cheese flavor while at the same time eliminating other normal constituents of milk and which allow the production of off-flavors. Further, the combination of sodium caseinate and butterfat forces the *Penicillium roqueforti* to grow in such a manner that both the fat derived ketone flavor profile and the protein derived flavor profile develop in substantially the correct proportions for producing an accurate bleu cheese flavor.

As will be appreciated, sodium caseinate is not a usual constituent in growth media for producing cheese flavors and it was surprising that the *Penicillium roqueforti* could utilize sodium caseinate as a protein nutrient in producing the bleu cheese flavor. For purposes of the present invention, the medium must contain sodium caseinate and casein or alkali caseins other than sodium caseinates are not equivalents in the present growth medium.

The fat portion of the medium may be other than butterfat, although butterfat provides superior results to other fats such as animal fat and vegetable fat. When vegetable fat or animal fat is used instead of butterfat, the product which results does not have the clear, complete, bleu cheese flavor, although some bleu cheese flavor is produced.

Accordingly, the invention provides a process for developing bleu cheese flavor comprising aerobically growing *Penicillium roqueforti* with aeration and agitation in an aqueous medium consisting essentially of 1 to 15 percent sodium caseinate and 1 to 50 percent butterfat for at least 24 hours at 15° to 40°C until a sharp, strong, aged, bleu cheese odor and flavor develops. It is preferred, however, that the aqueous fluid medium contain 3 to 12 percent, especially 5 to 10 percent sodium caseinate and from 3 to 30 percent, especially 3 to 15 percent butterfat. The growth period will vary in time depending upon the particular proportions of the constituents of the growth medium and the particular temperature utilized. Optimum growth periods within the preferred ranges of constituents will result with temperatures between about 17°C and 30°C and these periods will generally be no longer than 5 days, although longer growth periods, e.g. up to 30 days may be used if desired.

It is necessary that the growth take place under aerobic conditions and to this end, aeration and agitation of the fluid aqueous medium should be carried out. Accordingly, it is necessary that the medium remain fluid and to be susceptible to aeration and agitation sufficient to insure those aerobic conditions. The medium, therefore, should not have a viscosity greater than 100 Centipoises during the initial fermentation stage, although viscosities greater than this can be accommodated as the fermentation proceeds.

With the present process, it is not necessary to use the white mutant required by the Knight process and any of the mutants of Penicillium roqueforti may be used. However, the white mutants of the Knight process may be used, if desired, but the present process is not so limited.

Of course, the growth medium should be first pasteurized or sterilized to prevent the growth of unknown contaminating organisms and this may be accomplished by heating from 160° to 180°F for 5 to 20 minutes or to pasteurization or sterility at any times and temperatures.

After sufficient growth to develop the flavor of bleu cheese has been accomplished, the mixture should then again be pasteurized or sterilized in the manner noted above to prevent further growth of the organisms. Thereafter, the liquid product can be used directly for flavoring food products or alternately the liquid product can be dried or concentrated in any conventional manner. The product may be concentrated in a vacuum pan or dried on a roller drier or spray dried in a conventional spray drier.

Whether the liquid product, the concentrated product or the dried product is used to be incorporated into a food, the amount of the product used in the food can vary completely at will and consistent with the degree of bleu cheese flavor desired. Any food may be flavored with the present bleu cheese flavor product, including cheeses, such as bland, unaged cheese curds, relatively unaged bleu cheese, cottage cheese, salad dressings, dips, crackers, sauces, soups, and the like.

The following examples will illustrate the invention, but it should be noted that the examples are directed only to the preferred mode of operation and the invention is not limited to the examples but is fully applicable to the foregoing disclosure.

EXAMPLE 1

An aqueous mixture containing 10 percent sodium caseinate and 5 percent butterfat was sterilized in conventional manner by pasteurization at 161°F for 15 minutes. The mixture was then inoculated with *P. roqueforti* which was allowed to grow at 25°C with the agitation and aeration of the mixture continuously for 48 hours. At this time, a sharp, strong, aged blue cheese or Roquefort odor and flavor had developed.

To stop the growth of the organism the product was again pasteurized at 161°F for 15 minutes.

EXAMPLE 2

Example 1 was repeated except that instead of sodium caseinate, calcium caseinate is employed. After the 48-hour growth period, no significant amount of bleu cheese flavor is detected.

EXAMPLE 3

Example 1 is repeated except that casein is used in the growth medium instead of sodium caseinate. After the 48-hour growth period, no significant amount of bleu cheese flavor is detected.

Examples 2 and 3 illustrate the present requirement of sodium caseinate, as opposed to casein and calcium caseinate. While these differences are not completely understood, and while not being bound by theory, it is believed that the sodium caseinate presents the protein source for the organisms in such a form, especially in terms of solubility, that the organisms can assimilate the protein from sodium caseinate in contrast to the ability of the organisms to assimilate the protein from casein and calcium caseinate. This is believed to be the reason why the present process can develop the full-flavor profile of bleu cheese, including the protein derived flavors, while the Knight process mainly developed the fat derived ketone profile and not proportionate amounts of the protein derived flavor profile. This is understandable since milk contains casein, but as shown by the above examples, *Penicillium roqueforti* is not able to utilize casein as a protein source in an efficient manner to produce proportionate amounts of the protein-derived flavors of naturally produced bleu cheese. It is assumed that if the knight process were carried out for the length of time normally associated with the production of bleu cheese, i.e., 6 months or more, that the organisms would slowly utilize the casein in the milk medium to produce proportionate amounts of protein derived flavors, but such a long growth period would completely destroy the economical advantage of producing bleu cheese flavors as opposed to producing bleu cheese itself.

Accordingly, the above examples demonstrate that the alkali caseinates are not equivalent for the purposes of the present invention, and the use of sodium caseinate is necessary in order to obtain the bleu cheese flavor of the present invention with relatively short periods of time, which short periods of time are required to economically produce a blue cheese, as opposed to the production of bleu cheese itself.

As a further comparison, example 1 of the Knight patent was repeated, except that 1 liter of homogenized whole milk and cream was utilized, rather than the 1,000 pounds as set forth in that example. Otherwise, all ratios, conditions inoculums, etc. were observed. At the end of a 2-day period, a bleu cheese flavor was quite detectable, but the flavor was not that of a full bleu cheese profile and the flavor contained significant amounts of undesirable off-flavors which gave an unappetizing taste and odor to the product. Thereafter, fermentation was continued for an additional 5 days. While the strength of flavor increased during this additional 5-day period, the total character of the flavor did not change from that which was experienced after the initial 2-day growth period.

The above example illustrates that while the Knight process does produce a bleu cheese flavor, that flavor is deficient both in not having the protein-derived profile of bleu cheese and in having significant amounts of undesirable off-flavors.

Accordingly, it is necessary that the growth medium of the present invention consist essentially of sodium caseinate and a fat, most preferably a butter fat. The medium should not contain any other ingredient of any essential nature other than the foregoing ingredients.

What is claimed:

1. A process for developing bleu cheese flavor comprising aerobically growing *Penicillium roqueforti* with aeration and agitation in an aqueous medium consisting of water, 1 to 15 percent sodium caseinate and 1 to 50 percent butterfat for at least 24 hours at 15° to 40°C until a sharp, strong, aged bleu cheese odor and flavor develop.

2. A process according to claim 1 wherein the liquid system is agitated for up to 5 days.

3. A process according to claim 1 including the step of drying the product.

4. A process according to claim 1 wherein the Penicillium roqueforti is grown for 2 days.

5. A process according to claim 1 wherein the aqueous mixture contains 10 percent sodium caseinate and 5 percent butterfat.

* * * * *